Nov. 7, 1967 A. C. MAKRIDES ETAL 3,350,846
SEPARATION OF HYDROGEN BY PERMEATION
Filed Dec. 29, 1964
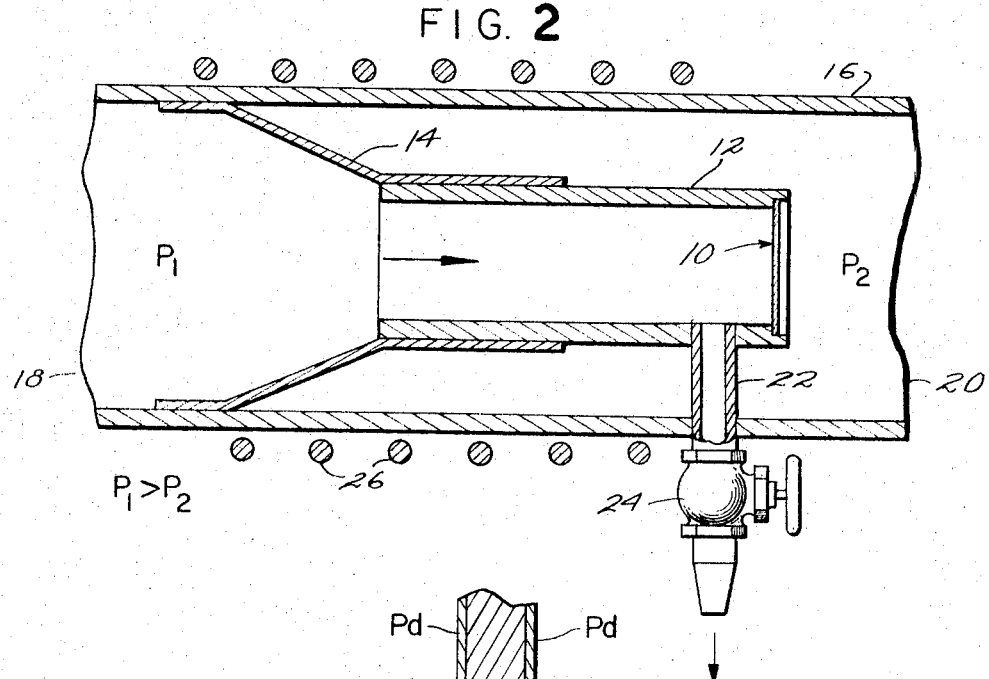
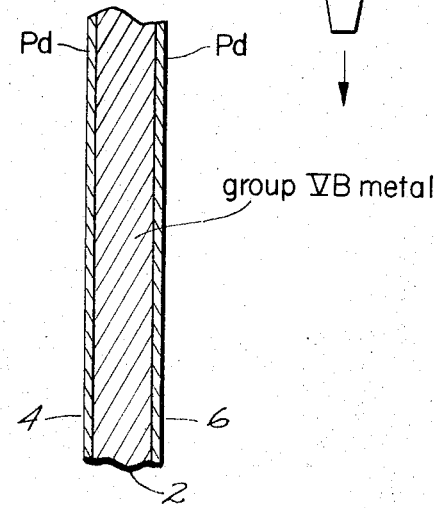
INVENTORS:
ALKIS C. MAKRIDES
MAURICE A. WRIGHT
BY DAVID N. JEWETT
*Nicholas P. Pandiscio*
ATTORNEY

SEPARATION OF HYDROGEN BY PERMEATION
Alkis C. Makrides, Newton, Maurice A. Wright, Holliston, and David N. Jewett, Harvard, Mass., assignors to Tyco Laboratories, Inc., Waltham, Mass., a corporation of Massachusetts
Filed Dec. 29, 1964, Ser. No. 421,850
22 Claims. (Cl. 55—16)

This invention relates to purification of hydrogen or its separation from a mixture of gases by diffusion through a hydrogen-permeable membrane. More particularly the invention is concerned with a method for separating hydrogen in a substantially pure form by means of a novel membrane which is permeable only to hydrogen.

Recent major developments, including rocket engines and fuel cells, have greatly increased the need for substantially pure hydrogen. To meet this need a variety of methods have been conceived and developed for economically separating pure hydrogen from fluid mixtures containing free hydrogen or of inexpensively purifying hydrogen gases containing excessive quantities of impurities. The more promising prior art processes involve passing fluid mixtures containing hydrogen through hydrogen-permeable barriers comprising thin films or sheets of palladium or silver-palladium. Examples of such processes are found in U.S. Patent 1,174,631 issued to Walter O. Snelling, and U.S. Patent 2,773,561 issued to James B. Hunter. In the Snelling patent a mixture of gases including hydrogen is brought into contact with one side of a very thin sheet or film of palladium which is maintained at an elevated temperature and is supported by a base of porous earthenware or some other ceramic material. By maintaining a lower pressure on the other side of the palladium, hydrogen is selectively permeated through the palladium and released in a purified form on the low pressure side. The Hunter patent teaches the use of a hydrogen-permeable membrane essentially consisting of a silver-palladium composition containing from 10 to 50 percent of silver.

The over-all permeation process is believed to consist of the following steps:

(1) molecular hydrogen in contact with the metal surface on the upstream side dissociates and goes into solution in the metal;

(2) the dissociated hydrogen diffuses through the lattice structure of the metal; and (3) upon reaching the downstream surface of the membrane the atomic hydrogen reconverts to molecular hydrogen and escapes from the surface.

While such methods involving palladium and silver-palladium membranes offer certain distinct advantages over other prior art methods which generally require more complicated and expensive equipment, it has been recognized that palladium and silver-palladium membranes have certain limitations. The most important limitation is cost. Other substantial limitations are relatively short operating life due to physical deterioration, inability to withstand high pressures, and relatively small rates of hydrogen production.

Accordingly a primary object of the present invention is to provide a novel method of purifying hydrogen.

Another primary object of this invention is to provide a new hydrogen diffusion element which offers significant advantages over prior hydrogen-permeable elements.

A further object of this invention is to provide a method for purifying hydrogen whereby a product stream of high purity is capable of being produced at a relatively high rate of production.

Still another object of the invention is to provide a novel element which is readily permeable to hydrogen but substantially impermeable to other gases in the commonly found gas mixtures containing hydrogen, whereby it permits recovery of a substantially pure hydrogen concentrate from a lower grade hydrogen stream contaminated with other gases at a high rate of production.

A more specific object of the invention is to provide a novel hydrogen-permeable element which is comparable to palladium and silver-palladium membranes in purity of gaseous product and its rate of production, but is less expensive to manufacture at current materials prices and can withstand higher pressures.

Other objects and many of the attendant advantages of the present invention will become more readily apparent from the following specification which is to be considered with the accompanying drawings wherein:

FIG. 1 is an enlarged sectional view of a portion of a preferred form of hydrogen diffusion membrane constructed according to the present invention; and FIG. 2 is a sectional view in side elevation of apparatus embodying the hydrogen diffusion membrane of FIG. 1.

Briefly, this invention essentially involves provision of a hydrogen-permeable membrane comprising a Group V–B metal coated with palladium or a composition containing palladium. In accordance with the invention, impure hydrogen under pressure (or a mixture of gases including free hydrogen) is brought into contact with one side of the membrane. The other side of the membrane is maintained at a lower pressure. This pressure differential promotes permeation of hydrogen through the membrane where it is collected in purified form.

Before proceeding with a more detailed description of the invention, the meaning of certain important terms used throughout this application is explained. As used herein, the term "permeation" indicates the overall process (described in the next sentence) for the transfer of gas through the solid material of a nonporous membrane from its high pressure side to its low pressure side. It is believed that this process whereby hydrogen is transported through the membrane essentially involves adsorption of the hydrogen gas on the high pressure surface of the membrane, dissolution of the hydrogen in an atomic state in the membrane and subsequent diffusion of the dissolved atoms through the lattice structure to the low pressure side of the membrane where it is desorbed. The term "permeability" signifies the rate of permeation of gas through the solid material rather than through holes, pores, or voids. Thus hydrogen permeability means the rate at which hydrogen will selectively pass through a membrane by the overall process of permeation. Permeability is determined by (a) the kinetics of the surface reaction, (b) the value of the diffusion constant in the solid membrane, and (c) the concentration gradient across the membrane. If the kinetics of the surface reaction are sufficiently favorable, permeability will depend primarily on the value of the diffusion constant and the concentration gradient and will increase with both. The term "porous" as used herein indicates a structural condition in which spaced voids, holes, or pores are dispersed throughout a solid mass in sufficient number and continuity to permit fluid flow through the mass. The term "permeable" is intended to characterize the condition which permits transport through the mechanism of dissolution, followed by solid state diffusion. The terms "hydrogen-permeable membrane" and "diffusion element" are used interchangeably and are intended to designate a member in the form of a continuous foil, tube or other suitable configuration which is hydrogen permeable but which is impervious or forms a barrier to the passage of the nonhydrogen component or components of a feed stock gas mixture.

Our experimentation with various materials as possible substitutes for palladium and palladium alloy diffusion membranes has disclosed that the Group V–B metals—vanadium, tantalum, and niobium—have lattices conducive to dissolution and diffusion of hydrogen in an atomic state. We have determined that they can dissolve more hydrogen and hence have a greater concentration gradient for the same pressure differential than palladium but exhibit a lower diffusion constant. On balance they are somewhat more permeable than palladium at 400–500° C. with the same pressure differential. On the other hand they also cost less and have greater tensile strength than palladium. However, we have also determined that they have a tendency to become "poisoned," probably with an oxide surface film which cuts down their permeability. While this poisoning can be removed by heating in a vacuum, the membrane readily becomes poisoned again at lower temperatures. Hence, diffusion membranes consisting of only Group V–B metals are of little, if any, practical value.

However, we have discovered that the tendency of Group V–B metals to become "poisoned" can be overcome if they are coated with palladium or a palladium alloy after an initial surface treatment. The applied palladium coating protects the surfaces of the Group V–B metal and hence improves its long term permeability.

The palladium coating does not become "poisoned" like tantalum, vanadium, and niobium. It is a fact that oxides have a tendency to form on palladium at about 600° C. However, palladium oxides are unstable and are quickly reduced with hydrogen at that and lower temperatures.

Following is a description of the method of preparing tantalum membranes according to the present invention. Referring now to the construction shown in part in FIG. 1, a foil of tantalum 2 is etched electrolytically in hydrofluoric acid and washed with acetone. Then while the foil is still wet with acetone, it is placed in a vacuum chamber where is is dried by evacuation, after which palladium is sputtered onto both sides to form very thin films 4 and 6 which are free of voids, holes, and pores. The deposition of palladium is accomplished in an argon atmosphere at a pressure of about 1 mm. with conventional equipment.

Niobium and vanadium membranes are fabricated in the same way as tantalum membranes. In addition, vanadium may be prepared by omitting the etching step and simply heating it in the vacuum chamber to about 1,000° C. to get rid of surface oxides. Thereafter palladium films are deposited on the vanadium by sputtering or by evaporation with equal success.

FIG. 2 illustrates a typical apparatus embodying a tantalum membrane made in accordance with the method described above. The membrane, identified generally at 10, is mounted in the end of a stainless steel tube 12 by electron beam welding. Tube 12 is supported by a holder 14 within a chamber 16 having an inlet 18 for introduction of a gaseous mixture containing hydrogen and an outlet 20 for hydrogen product. A pressure differential across the membrane is achieved by supplying a raw gas mixture at a high pressure $P_1$ and/or by connecting outlet 20 to a pump. The absolute pressure $P_2$ on the downstream side of the membrane may be at any desired level, such as atmospheric or less. Tube 12 has a side outlet 22 for nonpermeated gas. A valve 24 controls the flow of nonpermeated gas and helps control the pressure drop across the membrane. It is contemplated that the nonpermeated gases flowing through side outlet 22 may be recirculated back through the same diffusion unit or passed on to a second diffusion unit. The hydrogen product may be used as is or it may be passed on to a second diffusion unit for further refining.

The diffusion unit of FIG. 2 is maintained at an elevated temperature by means of an electrical heating coil 26, or the like. The electrical heating element may not be required where the incoming gaseous mixture is at an elevated temperature since the diffusion unit will be heated up by contact with the gaseous mixture.

The apparatus of FIG. 2 may be used as follows: The tantalum-palladium diffusion membrane is heated to a temperature of 500° C. Then a gas containing hydrogen is introduced at inlet 18 under a pressure of about 400 mm. Hg while outlet 20 is held at substantially zero pressure. Under such conditions hydrogen will permeate readily through the membrane. Nondiffused gas is removed via outlet 22. Under the foregoing conditions, a membrane with an overall thickness of .008", and with palladium coatings of 1,000 A. thickness, will pass hydrogen at a rate in the order of .1 cc./sec./cm.$^2$.

As is well known, the rate of permeation is affected by membrane thickness; the rate of permeation is inversely proportional to membrane thickness. Accordingly it is evident that it is desirable to use the thinnest membrane possible to maximize the rate of permeation. However, there is a lower limit on thickness which must be observed to withstand applied pressures without rupturing and to avoid pinholes, voids, etc. As a practical matter a minimum membrane thickness in the order of 1 mil. is required. Using a greater membrane thickness permits utilization of higher upstream pressures which are desirable in the handling of commercial gases. However, while use of higher pressures tends to improve permeability, greater membrane thickness also means more resistance to permeation of the gas through the membrane. In practice an overall membrane thickness in the order of 10 mils. is commonly employed; however, thickness at least as high as 20 mils. are also feasible.

With respect to the individual lamellae, it is preferred that the Group V–B metal have a thickness in the range of from about .001 inch to about .020 inch, while the palladium films each have a minimum thickness in the range of from about 100 A. to about 1,000 A. Using palladium films less than 100 A. thick is not recommended since pinholes result if the film is too thin. While palladium film thicknesses greater than 1,000 A. will yield satisfactory results, they are not preferred because of increased cost.

Since in general the permeation rate through a solid increases with temperature, it is preferred to maintain the diffusion membrane at a relatively high temperature. While the invention is not limited in its application to a particular operating temperature, it is preferred that diffusion be carried out at a membrane temperature of about 400° C. Membranes using Group V–B metals have been operated down to about 300° C. with satisfactory performance and life. Temperatures above 400° C. also are acceptable, e.g. 600–700° C.

The following tables shows results of measurements of the hydrogen permeabilities of membranes of tantalum, niobium, and vanadium coated on both sides with palladium films measuring about 1,000 A. thick. Membrane A consisted of .008" tantalum foil. Membrane B consisted of .005" niobium foil. Membrane C consisted of .010" vanadium foil. In obtaining the results shown in this table, hydrogen was permeated through the membranes with the downstream side at approximately zero pressure:

| Membrane | Pressure Differential (mm. Hg) | Membrane Temperature (° C.) | Permeability (cc./sec./cm$^2$) |
|---|---|---|---|
| A | 484 | 400 | .084 |
|   | 484 | 500 | .101 |
|   | 256 | 400 | .051 |
|   | 256 | 500 | .066 |
|   | 144 | 400 | .017 |
|   | 144 | 500 | .042 |
| B | 484 | 400 | .158 |
|   | 256 | 500 | .108 |
|   | 144 | 500 | .074 |
| C | 230 | 550 | .026 |
|   | 138 | 550 | .016 |

Certain characteristics of the Group V–B metals and the new diffusion membranes are worth noting. Since the palladium films are very thin, the intermediate Group V–B metal effectively determines the overall rate of diffusion through the membrane. Vanadium is ductile and thus lends itself to fabrication into other forms in addition to the foil-type shown in the drawing. It also has much greater tensile strength than palladium over all operating temperatures. Tantalum exhibits somewhat better permeability than vanadium, and it also has better bulk diffusion than palladium or palladium-silver alloys at the preferred operating temperatures noted above. Like vanadium, tantalum is ductile and also has much better tensile strength than palladium and palladium-silver alloys over the entire range of preferred operating temperatures. Niobium also exhibits good hydrogen permeability, as well as being ductile and having better tensile strength than palladium. Like vanadium and tantalum it readily accepts coatings of palladium.

It has been determined also that Group V–B metal membranes exhibit a tendency to become brittle when subjected to repeated cycles of heating and cooling in a hydrogen atmosphere between room temperatures and operating temperatures. It has been found that this tendency to become brittle can be overcome by evacuating the diffusion unit before cooling. It is believed that the brittleness is caused by hydrogen absorbed in the membrane lattice since out-gassing of hydrogen before cooling effectively overcomes this difficulty.

Although it is preferred that the Group V–B metals be coated with films of pure palladium, it is to be understood that membranes of the present invention may be constructed using palladium alloys of the kind well known in that art, instead of pure palladium. The preferred substitute is a palladium-silver alloy containing silver in an amount falling within the range of about 10 percent to about 50 percent by weight. Alternatively the protective films may be formed of a palladium-gold alloy, preferably containing about 20–40 percent gold, or a palladium-boron alloy, preferably containing up to 10 percent boron. Still other palladium alloys may suggest themselves to persons skilled in the art. Palladium alloy films are applied to the Group V–B metals in the same thickness as films of pure palladium. The operating pressures and temperatures for membranes embodying a Group V–B metal coated with thin films of a selected palladium alloy are substantially the same as those specified above for membranes coated with pure palladium. It is contemplated also that the use of palladium alloys in place of palladium per se applies regardless of whether the membranes are in the shape of a foil or tube or take some other useful form. Similarly it is understood that membranes made in the manner described herein may be backed by a porous substrate made of a ceramic, plastic, or sintered metal material.

Having described our invention, it is to be understood that it is not to be limited to the specific examples and illustrations provided herein and that it may be practiced otherwise than as described or illustrated in accordance with the scope of the appended claims.

We claim:

1. A process for the recovery of hydrogen from a gaseous mixture comprising the steps of contacting such gaseous mixture with one side of a nonporous metallic membrane comprising a layer of a Group V–B metal coated on both sides with a continuous nonporous film comprising palladium; permeating the hydrogen through said membrane and removing such permeated hydrogen from the opposite side of said membrane.

2. A process as defined in claim 1 which includes the step of heating said membrane to a diffusion-promoting temperature prior to contacting it with said gaseous mixture.

3. A process according to claim 1 wherein said Group V–B metal is vanadium.

4. A process according to claim 1 wherein said Group V–B metal is tantalum.

5. A process according to claim 1 wherein said Group V–B metal is niobium.

6. A process according to claim 1 wherein said membrane is at a temperature in the range of about 300° to about 700° C.

7. A process according to claim 6 wherein said membrane is at a temperature of about 400° C.

8. A process according to claim 1 wherein said film consists of one of the following materials: (a) palladium and (b) a palladium alloy from the group consisting of palladium-gold, palladium-silver, and palladium-boron alloys.

9. A process for the recovery of free hydrogen from a gaseous mixture comprising hydrogen and other gases comprising the steps of bringing said gaseous mixture into contact with one side of a thin nonporous membrane consisting essentially of a layer of a Group V–B metal covered with a thin continuous nonporous layer of palladium, causing the hydrogen content of said gaseous mixture to permeate in turn through said layer of palladium and said layer of Group V–B metal, and removing the permeated hydrogen from the opposite side of said membrane.

10. A process for recovery of hydrogen from a gaseous mixture comprising hydrogen and other undesirable gases comprising the steps of bringing said gases into contact with one side of a nonporous membrane that is at an elevated temperature and consists essentially of an inner layer of a Group V–B metal sandwiched between two continuous nonporous outside layers of a palladium composition, maintaining a pressure differential between the two sides of said diaphragm with said one side at a higher pressure than the other side so as to cause a portion of said hydrogen to permeate through said membrane, and removing the permeated hydrogen from the other side of said membrane.

11. A hydrogen diffusion element comprising a relatively thick layer of a Group V–B metal coated on opposite sides with relatively thin continuous nonporous layers comprising palladium.

12. A hydrogen diffusion element as defined by claim 11 wherein each of said layers consists of palladium.

13. A hydrogen diffusion element as defined by claim 11 wherein each of said layers consists of a palladium alloy.

14. A hydrogen diffusion element as defined by claim 11 wherein said Group V–B metal is tantalum and said layers consist of an alloy of palladium and a member of the group consisting of gold, silver, and boron.

15. A hydrogen diffusion element as defined by claim 11 wherein said Group V–B metal is vanadium and said layers consist of an alloy of palladium and a member of the group consisting of gold, silver, and boron.

16. A hydrogen diffusion element as defined by claim 11 wherein said Group V–B metal is niobium and said layers consist of an alloy of palladium and a member of the group consisting of gold, silver and boron.

17. A hydrogen diffusion element as defined by claim 11 wherein the thickness of said relatively thick layer is in the range of .001 to .020 inch and the thickness of each of the relatively thin layers is in the range of 100 to 1,000 A.

18. A hydrogen diffusion element as defined by claim 11 wherein the Group V–B metal is tantalum.

19. A hydrogen diffusion element as defined by claim 18 wherein the Group V–B metal is vanadium.

20. A hydrogen diffusion element as defined by claim 18 wherein the Group V–B metal is niobium.

21. A hydrogen diffusion element comprising a layer of a Group V–B metal coated with a continuous nonporous film comprising palladium, said layer having a thickness in the range of 0.001 to 0.020 inch and said film having a thickness in the range of 100 to 1000 A.

22. A hydrogen diffusion element comprising a relatively thick layer of a material from the group consisting of vanadium, tantalum and niobium coated on opposite sides with relatively thin continuous nonporous layers of a material from the group consisting of palladium and an alloy of palladium with a metal from the group consisting of silver, gold and boron.

References Cited

UNITED STATES PATENTS

| 3,148,031 | 9/1964 | Vahldieck et al. | 55—16 X |
| 3,232,026 | 2/1966 | McKinley | 55—16 |
| 3,241,298 | 3/1966 | Pierce | 55—16 |

SAMIH N. ZAHARNA, *Primary Examiner.*

REUBEN FRIEDMAN, *Examiner.*

J. W. ADEE, *Assistant Examiner.*